April 11, 1950  L. J. WEBER  2,503,461
CONSTANT SPEED PROPELLER

Filed June 17, 1946  2 Sheets-Sheet 1

Inventor
Louis J. Weber
By Lyon & Lyon
Attorneys

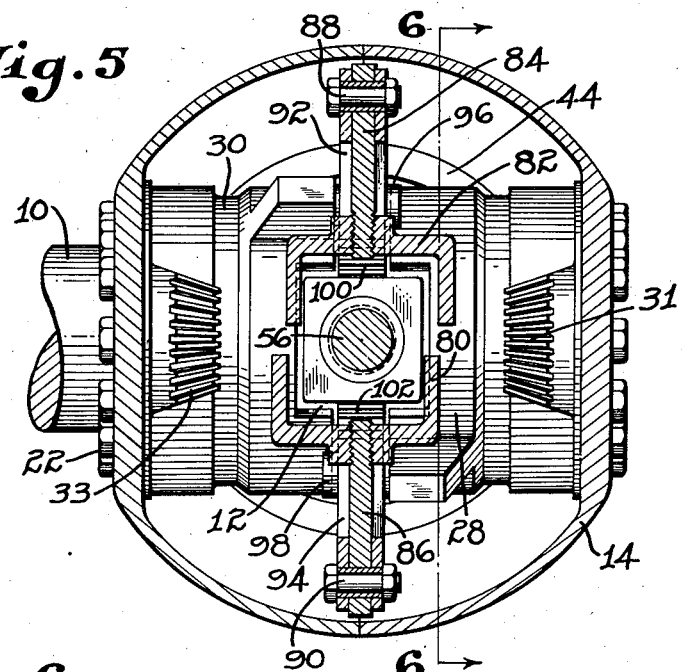

Patented Apr. 11, 1950

2,503,461

UNITED STATES PATENT OFFICE 2,503,461

CONSTANT SPEED PROPELLER

Louis J. Weber, Los Angeles, Calif.

Application June 17, 1946, Serial No. 677,274

7 Claims. (Cl. 170—160.16)

This invention relates to aircraft propellers of the variable pitch type and more particularly to an aircraft propeller adapted to compensate in pitch for variations in power in such manner that the said propeller will revolve at a substantially constant speed.

It is my object to provide a propeller whereby, when increased power is transmitted to the said propeller, the blade pitch thereof will increase causing the propeller speed to remain as it was prior to the power increase. Conversely, it also is my object to provide such propeller that when the power transmitted to the said propeller is decreased, the blade pitch will decrease, enabling the blade to revolve at its previous rate.

It is my object to accomplish the aforesaid object in a propeller of light weight and of simple, inexpensive construction, the said propeller being adapted especially for light plane use. Heretofore weight and expense factors have prevented the wide spread adoption by light plane owners of constant speed propellers, and it is my intention by this invention to substantially reduce the aforementioned factors and bring to the light plane owners a constant speed propeller.

Other objects and advantages of this invention, it is believed, will be apparent from the following detailed description of a preferred embodiment thereof as illustrated in the accompanying drawings:

Figure 5 shows an enlarged view in cross section of the propeller taken along the line 5—5 of Figure 3.

Figure 6 is a section taken along the line 6—6 of Figure 5.

Figure 1:
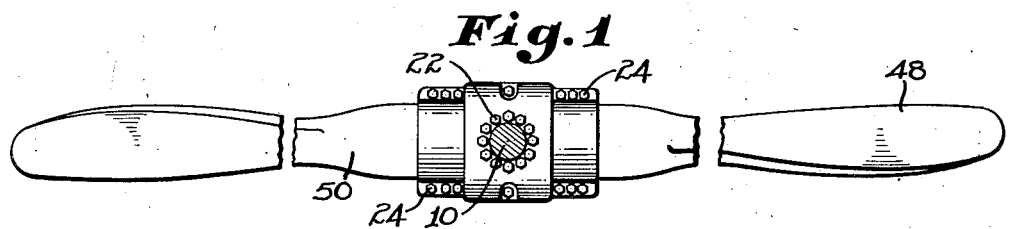
Figure 1 is a plan view of an aircraft propeller embodying my invention.

The general operation of my propeller depends upon providing opposed weights or cylinders within the blades which are acted upon by centrifugal forces and which, in turn, vary the pitch of the said propeller to control its speed. The centrifugal movement of the said cylinders is resisted by torsion rods and a balance is struck between the said cylinders and the said torsion rods whereby the propeller is induced to revolve at a substantially constant speed.

Referring to the drawings, the engine shaft 10 projects into the sleeve 12, is splined thereto, and is held against axial movement with respect to the said sleeve 12 by the castle nut 16, the said castle nut 16 having slots 18 therein with which coacts the cotter pin 20. The hub casing 14 is held rigid with the said sleeve 12 by the bolts 22 and being in two sections is clamped together by the bolts 24.

Mounted rotatably about the sleeve 12 on the bearing rings 26 is the collar 28 having gear segments 31 and 32 mounted oppositely about its periphery. Similarly mounted about the sleeve 12 is the collar 30 having gear segments 33 and 34 mounted oppositely about its periphery. The gear segments 31 and 33 coact with the gear segments 35 and 36 of a rotatable shell member 38 which rides within the hub casing 14 on roller bearings 40, and the gear segments 32 and 34 likewise coact with the gear segments 41 and 42 of the rotatable shell member 44 which rides within the hub casing 14 on the roller bearings 46. Keyed to the shell members 38 and 44 by press fitting or in other common manner are the propeller blades 48 and 50 which rotate with the said shell members to change their pitch.

The sleeve 12 has two bosses 52 and 54 which are threaded and pinned to receive the torsion rods 56 and 58. The torsion rod 56 is provided with a hexagonal flange 60 which is received in the hexagonally countersunk portion 62 of the shell member 38. A nut 64 is threaded on the end of the torsion rod 56 and pinned thereto. The torsion rod 58 is similarly affixed to the shell member 44.

Within the shell member 38 slides a cylinder 66 having a bore adapted to slidably receive the said torsion rod 56. The cylinder 66 is provided with bores 68 and 70, the said bores being threaded and enlarged to receive threaded shafts 72 and 74 which are provided with screw heads for insertion into the cylinder 66. The cylinder 66 is also provided with the triangular grooves 76 and 78 which receive the brackets 80 and 82, the said brackets being mounted pivotally with respect to the cylinder 66 on the shafts 72 and 74. The bracket 82 is threaded to receive a rod 84 and the bracket 80 is threaded to receive a rod 86. The rods 84 and 86 are bored to receive the bolted collared shafts 88 and 90, which shafts pivotally carry the toothed arms 92 and 94. The toothed arms 92 and 94 are in turn mounted pivotally upon studs 96 and 98. The stud 96 is carried by the collar 30 while the stud 98 is carried by the collar 28. The sleeve 12 has about its center at its periphery four sets of teeth, the teeth 100, 102, 104, and 106.

The teeth 100 are adapted to coact with the toothed arm 92 while the teeth 102 coact with the toothed arm 94.

The torsion rod 58, which is threaded and pinned into the boss 54 opposite the boss 52, is related to the structure exactly as is its corresponding member on the other side. That is, the torsion rod 58 is keyed to the shell member 44 through a hexagonal arrangement. Likewise, within the shell member 44 and about the torsion rod 58 slides a cylinder 108 triangularly grooved to receive brackets 110 and 112, which are mounted pivotally with respect to the cylinder 108 upon shafts 113 and 115 which are threadably inserted into the said cylinder 108. The rods 114 and 116 are threaded into the brackets 110 and 112 respectively and as on the opposite side, are pivotally connected to the bolted collared shafts 117 and 119 which carry, respectively, the toothed arms 120 and 122. The toothed arm 120 pivots on a stud 124 on the geared collar 28 while the toothed arm 122 pivots on a stud 126 on the collar 30. Similarly, the toothed arm 120 coacts with the gear teeth 106 on the sleeve 12 and the toothed arm 122 coacts with the gear teeth 104 on the said sleeve 12.

In operation, as heretofore stated, my device depends upon the application of centrifugal forces. Considering the propeller shown in Figure 1 as travelling in a direction away from the reader and rotating clockwise with respect to the reader, when the revolutions per minute of the engine is increased, and consequently of the engine shaft 10, the blades 48 and 50 will likewise turn more rapidly; and so long as the pitch of the said blades remains constant, the propeller will rotate at a faster rate than before. In my invention, however, there is now caused an increased centrifugal force upon the cylinders 66 and 108 and as a result thereof, they move outwardly within the shell elements 38 and 44. As this is done, the brackets 80, 82, 110, and 112 are carried outwardly with the said cylinders and through the rods 86, 84, 114, and 116 a cranking action is imparted to the toothed arms 94, 92, 120, and 122, which pivot about their respective studs 90, 88, 117, and 119.

Due to the coaction between the toothed arm 94 and the gear teeth 102 upon the sleeve 12, the toothed arm 94 walks, as it were, about the periphery of the said sleeve 12. Since the sleeve 12 is fixed in relation to the structure, by virtue of a levering action upon the stud 98, the collar 28 is caused to rotate counter-clockwise with respect to the sleeve, the engine shaft 10, and the hub casing 14.

Figure 2:
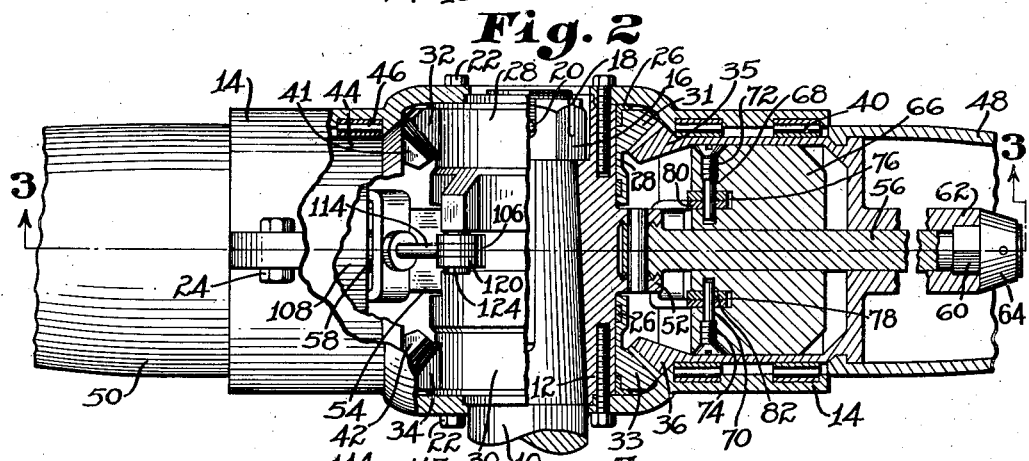
Figure 2 is an enlarged longitudinal section of said propeller taken along the line 2—2 of Figure 3.
Figure 3:
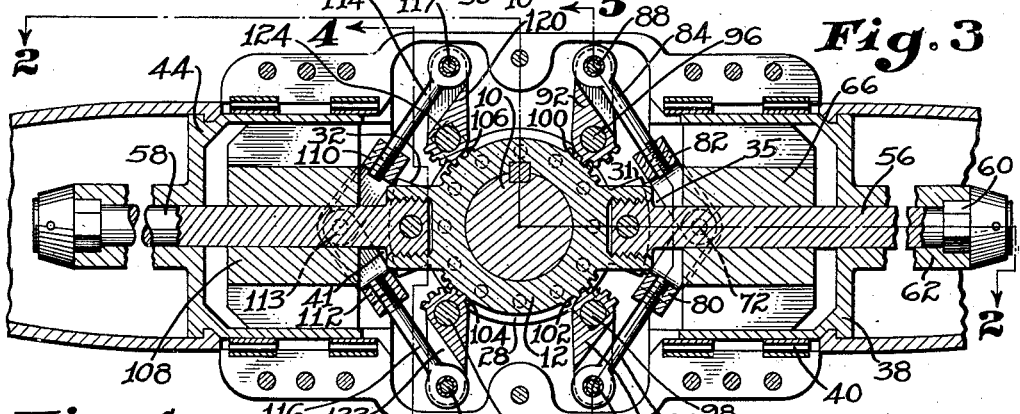
Figure 3 is a longitudinal section taken along the line 3—3 of Figure 2.
Figure 4:
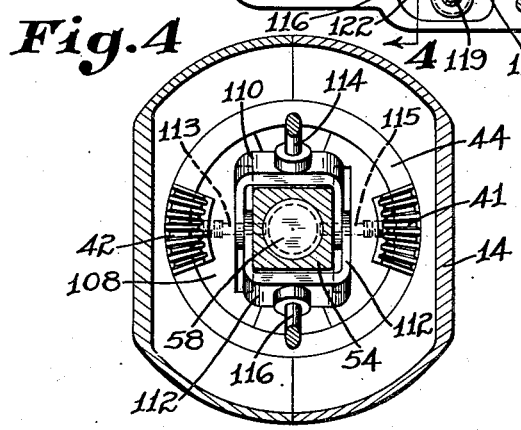
Figure 4 shows a cross section through the propeller along the line 4—4 of Figure 3.

Simultaneously the toothed arm 120, which coacts with the teeth 106 upon the sleeve 12, walks about the periphery of the said sleeve 12. This induces a levering action upon the stud 124 on the collar 28 and causes the said collar 28 to rotate counterclockwise with respect to the said sleeve 12. The rotation counterclockwise of the collar 28 upon the sleeve 12 induces through the coaction of the gear segment 31 upon the said collar 28 with the gear segment 35 upon the shell member 38, a corresponding rotation in the said shell member 38. This rotation of the shell member 38, the blade 48 being keyed thereto, increases the pitch of the said blade 48. This is best shown by reference to Figure 2 and Figure 1.

At the same time, through the gear segments 32 and 41, the counterclockwise rotation of the collar 28 induces a corresponding rotation in the shell member 44, which increases the pitch of the blade 50.

The collar 30 is, at the same time, caused to rotate clockwise with respect to the sleeve 12 as a result of the walking of the toothed arms 92 and 122 upon the sleeve 12 and the consequent levering action through the studs 96 and 126. The clockwise rotation of the collar 30 induces through the coaction of its gear segments 33 and 34 with the gear segment 36 on the shell member 38 and the gear segment 42 upon the shell member 44 corresponding rotations of the said shell members which match the rotations induced therein by the counterclockwise rotation of the shell member 28. Thus, the shell members 28 and 38 rotating in opposite directions cooperate to increase the pitch of the blades 48 and 50.

Increase in pitch of the propeller blades having been accomplished, the speed of the propeller decreases, tending to return to its original speed. The torsion rods 56 and 58, which are keyed to the structure and to their respective blades, in the meantime have resisted the change in pitch and, thus, a balance is struck between the torque in the said torsion rods and the centrifugal force upon the cylinders 66 and 108. Since the centrigual force upon the said cylinders is a function of the speed of rotation of the propeller, the propeller will tend to hold the engine at a constant R. P. M.

It is to be noted that since all of the centrifugal load of the blades is carried by the torsion rods 56 and 58, no thrust bearings in my propeller are necessary. Similarly, since the loads upon the hub casing 14 are but bending and torque loads rather than the larger centrifugal load, such casing can be materially lightened.

In respect to the torsion rods 56 and 58, it is apparent that as the cylinders 66 and 108 tend to move outwardly, changing the pitch of the blades, the torque forces upon the said torsion rods must increase in accordance with the princiciple that stress and strain are proportional. Otherwise stated, this means that as the twisting of the said torsion rods increases, the forces necessary to accomplish such twisting must also increase.

I have provided the toothed arms 92, 94, 120, and 122 with a cranking action which overcomes the necessary proportionate forces by virtue of the fact that as the cylinders 66 and 108 move outwardly, increasing the deflection upon the said torsion rods, the effective moment about the studs 96, 98, 124, and 126 is likewise increased. Thus, the centrifugal forces necessary to increase the pitch of the propeller blades remain substantially constant as the said pitch is increased.

It also should be observed that where the power induced into the propeller is decreased, the lessening centrifugal forces upon the cylinders 66 and 108 result in decreasing the pitch of the propeller blades exactly in reverse of the above set forth pitch increasing. Because the friction of changing pitch exists almost exclusively in the molecular friction in the torsion rods, the tendency of the propeller to "hunt" is materially reduced; that is, the tendency of the blades to oscillate between a high pitch and a low pitch rather than to remain at substantially the same pitch and substantially the same speed is minimized.

Having fully described my invention, it is to be understood that I do not wish to be limited to the details herein set forth, but my invention is of the full scope of the appended claims.

I claim:

1. A device of the class described, comprising: a body structure; torsion rods extending radially from said body structure and keyed thereto at their inner ends; shell members rotatable in said body structure; blades supported by said shell members, the outer ends of said torsion rods, said shell members, and said blades being in rigid relationship therebetween; weights slidable within said shell members radially in respect to said body structure; collars rotatably mounted in said body structure and operatively connected to said blades; and means operatively connecting said collars and said weights, said means comprising linking members pivotally connected to said weights, toothed arms pivotally connected to said linking members and said collars, and means on said body structure coacting with said toothed arms.

2. A device of the class described, comprising: a body structure, torsion rods extending radially from said body structure and keyed thereto at their inner ends; shell members rotatable in said body structure; blades supported by said shell member, the outer ends of said torsion rods, said shell members, and said blades being in rigid relationship therebetween; weights slidable within said shell members radially in respect to said body structure; collars rotatably mounted in said body structure; means operatively connecting said collars and said weights, said means comprising linking members pivotally connected to said weights, toothed arms pivotally connected to said linking members and said collars, and means on said body structure coacting with said toothed arms; and means operatively connecting said collars and said shell members, said means comprising teeth segments on said collars and teeth segments on said shell members coacting therewith.

3. A device of the class described, comprising: a body structure; a torsion rod extending radially from said body structure and keyed thereto at its inner end; a shell member rotatable in said body structure; a blade supported by said shell member, the outer end of said torsion rod, said shell member, and said blade being in rigid relationship therebetween; a weight slidable within said shell member radially in respect to said body structure; collars rotatably mounted in said body structure and operatively connected to said blade; and means operatively connecting said collars and said weight, said means comprising linking members pivotally connected to said weight, toothed arms pivotally connected to said linking members and said collars, and means on said body structure coacting with said toothed arms.

4. A device of the class described, comprising: a body structure; a torsion rod extending radially from said body structure and keyed thereto at its inner end; a shell member rotatable in said body structure; a blade supported by said shell member, the outer end of said torsion rod, said shell member, and said blade being in rigid relationship therebetween; a weight slidable within said shell member radially in respect to said body structure; collars rotatably mounted in said body structure; means operatively connecting said collars and said weight, said means comprising linking members pivotally connected to said weight, toothed arms pivotally connected to said linking members and said collars, and means on said body structure coacting with said toothed arms; and means operatively connecting said collars and said shell member, said means comprising teeth segments on said collars and teeth segments on said shell member coacting therewith.

5. A device of the class described, comprising: a body structure; torsion rods extending radially from said body structure and keyed thereto at their inner ends; shell members rotatable in said body structure; blades supported by said shell members, the outer ends of said torsion rods, said shell members, and said blades being in rigid relationship therebetween; weights slidable within said shell members radially in respect to said body structure; collars rotatably mounted in said body structure; means operatively connecting said collars and said weights, said means comprising linking members pivotally connected to said weights, toothed arms pivotally connected to said linking members and said collars, and teeth on said body structure coacting with said toothed arms, said toothed arms being adapted upon movement of said weights to walk upon said body structure and to lever said collars rotationally; and means operatively connecting said collars and said shell members, said means comprising teeth segments on said collars and teeth segments on said shell members coacting therewith.

6. A device of the class described, comprising: a body structure; torsion rods extending radially from said body structure and keyed thereto at their inner ends; shell members rotatable in said body structure; blades supported by said shell members, the outer ends of said torsion rods, said shell members, and said blades being in rigid relationship therebetween; weights slidable within said shell members radially in respect to said body structure; collars rotatably mounted in said body structure; means operatively connecting said collars and said weights, said means comprising linking members pivotally connected to said weights, arms pivotally connected at one of their extremities to said linking members, said arms having tooothed other extremities, means on said body structure coacting with said toothed extremities of said arms, and pivotal connections between said arms and said collars, said toothed arms being upon radial outward movement of said weights adapted to walk upon said body structure and to lever said collars rotationally with a force proportional to the extent of radial movement of said weights; and means operatively connecting said collars and said shell members.

7. A device of the class described, comprising: a body structure; torsion rods extending radially from said body structure and keyed thereto at their inner ends; variable pitch blades supported by said body structure and keyed to said torsion rods at their outer ends; weights at either side of and slidable radially in respect to said body structure; collars rotatably mounted in said body structure; means operatively connecting said collars and said weights, said means comprising linking members pivotally connected to said weights, toothed arms pivotally connected to said linking members and to said collar members, said toothed arms being adapted to coact with said body structure upon the radial movement outwardly of said weights to lever said collars rotationally, the force of said levering being proportional to the extent of outward movement of said weights; and means operatively connecting said collars and said blades.

LOUIS J. WEBER.

(References on following page)

REFERENCES CITED

The following references are of record in the file of this patent:

UNITED STATES PATENTS

| Number | Name | Date |
|---|---|---|
| 2,103,740 | Algarsson | Dec. 28, 1937 |
| 2,139,982 | Smith | Dec. 13, 1938 |
| 2,147,078 | Barish | Feb. 14, 1939 |
| 2,237,030 | Gathmann | Apr. 1, 1941 |
| 2,275,361 | Godfrey | Mar. 3, 1942 |
| 2,294,867 | Bottrill | Sept. 1, 1942 |

FOREIGN PATENTS

| Number | Country | Date |
|---|---|---|
| 332,451 | Italy | Nov. 29, 1935 |
| 675,377 | Germany | Apr. 21, 1939 |
| 733,739 | France | Oct. 10, 1932 |